United States Patent
Ma

(10) Patent No.: US 7,136,373 B2
(45) Date of Patent: Nov. 14, 2006

(54) INTERCEPTION CALL SIGNALING METHOD AND APPARATUS BETWEEN A GATEKEEPER AND AN INTELLIGENT PERIPHERAL IN A VOICE FRAME NETWORK

(75) Inventor: Gene Ma, Irvine, CA (US)

(73) Assignee: Cisco Technology, Inc., San Jose, CA (US)

( * ) Notice: Subject to any disclaimer, the term of this patent is extended or adjusted under 35 U.S.C. 154(b) by 649 days.

(21) Appl. No.: 09/753,360

(22) Filed: Dec. 29, 2000

(65) Prior Publication Data

US 2002/0018461 A1  Feb. 14, 2002

Related U.S. Application Data

(63) Continuation-in-part of application No. 09/609,201, filed on Jun. 30, 2000, now Pat. No. 7,006,487.

(51) Int. Cl.
*H04L 12/66* (2006.01)
*H04M 7/00* (2006.01)

(52) U.S. Cl. ............... 370/352; 370/389; 370/401; 379/229

(58) Field of Classification Search ............ 370/354, 370/355, 352, 389, 410, 401, 522; 379/900, 379/229
See application file for complete search history.

(56) References Cited

U.S. PATENT DOCUMENTS

| | | | | |
|---|---|---|---|---|
| 5,535,263 | A * | 7/1996 | Blumhardt | 379/88.21 |
| 6,449,260 | B1 * | 9/2002 | Sassin et al. | 370/270 |
| 6,459,697 | B1 * | 10/2002 | Neyman | 370/352 |
| 6,466,662 | B1 * | 10/2002 | Klaghofer et al. | 379/212.01 |
| 6,487,196 | B1 * | 11/2002 | Verthein et al. | 370/352 |
| 6,614,784 | B1 * | 9/2003 | Glitho et al. | 370/352 |
| 6,646,997 | B1 * | 11/2003 | Baxley et al. | 370/260 |
| 6,657,975 | B1 * | 12/2003 | Baxley et al. | 370/260 |
| 6,711,156 | B1 * | 3/2004 | Gourraud | 370/352 |

(Continued)

OTHER PUBLICATIONS

Mussman et al.; "Screening Inbound Calls in a Packet-Based Communications Network"; Oct. 31, 2002; United States Patent Application Publication.*

(Continued)

*Primary Examiner*—Chi Pham
*Assistant Examiner*—Tri H. Phan
(74) *Attorney, Agent, or Firm*—Marger Johnson & McCollom, P.C.

(57) ABSTRACT

Telecommunications apparatus between a voice frame network gatekeeper and an intelligent peripheral, e.g. an interactive voice response unit (IVR), includes a voice frame network connection for coupling the same. The apparatus further includes a protocol over the connection that provides supplemental service messaging therebetween, the protocol enabling the gatekeeper to selectively insert one or more messages to the intelligent peripheral and to selectively intercept one or more messages therefrom. Preferably such insertion is of one or more GR-1129-CORE send-to-resource (STR) messages and such interception is of one or more ITU-T H.323 FACILITY messages including a RETURN RESULTS component. An invocation mechanism within the gatekeeper and a performance mechanism within the IVR permits the gatekeeper to set a defined task to the IVR, also preferably in accordance with the ITU-T H.323 and H.450 standards. The method involves configuring the gatekeeper as a supplemental services provider (SSP) and configuring the IVR as an intelligent peripheral, under ITU-T H.450. The method further involves conveying requests from the gatekeeper to the IVR and conveying responses thereto from the IVR to the gatekeeper, wherein the gatekeeper selectively intercepts one or more messages from the IVR and, optionally, also selectively inserts one more messages to the IVR.

22 Claims, 4 Drawing Sheets

U.S. PATENT DOCUMENTS 6,816,586 B1 * 11/2004 Tuunanen .............. 379/221.08
6,868,090 B1 * 3/2005 Ma et al. .................... 370/469
6,947,541 B1 * 9/2005 Tuunanen .............. 379/221.08

OTHER PUBLICATIONS

O'Brien, Jr.; "Providing Voice Over Internet Protocol Networks"; Feb. 13, 2003; United States Patent Application Publication.*
Generic Functional Protocol for the Support of Supplementary Services in H.323 (CD).
AINGR: Switch—Intelligent Peripheral Interface (IPI), Revision 1, Oct. 1998 (CD).
Call Signaling Protocols and Media Stream Packetization for Packet Based Multimedia Communications System, Feb. 1998 (CD).
Call Transfer Supplementary Service for H.323I, Sep. 1997 (CD).
ISDN User-Network Interface Layer 3 Specification for Basic Call Control, Mar. 1993 (CD).

* cited by examiner

INTERCEPTION CALL SIGNALING METHOD AND APPARATUS BETWEEN A GATEKEEPER AND AN INTELLIGENT PERIPHERAL IN A VOICE FRAME NETWORK

RELATED PATENTS

The present application is a continuation-in-part of U.S. patent application Ser. No. 09/609,201 entitled VOICE FRAME NETWORK GATEKEEPER-TO-INTELLIGENT PERIPHERAL INTERFACE METHOD AND APPARATUS filed Jun. 30, 2000 now U.S. Pat. No. 7,006,487 and subject to assignment in common herewith to Cisco Technology, Inc.

BACKGROUND OF THE INVENTION

The present invention relates generally to voice frame network gatekeepers and intelligent peripherals such as interactive voice response units (IVRs), and more particularly it concerns method and apparatus for interfacing gatekeepers to intelligent peripherals via the ITU H.323 and H.450 standards.

Previously, intelligent peripherals have been connected to gatekeepers within the Internet using proprietary interfaces. One such proprietary interface is (Bellcore) GR-1129-CORE, which can be used to connect an intelligent peripheral such as an IVR into an advanced intelligent network (AIN). The AIN includes a switch service point (SSP) with call-processing software and voice channel control and a service control point (SCP) with data-based (e.g. 800 or LNP) information required by the SSP to route a call. The intelligent peripheral is a special resource that provides additional functionality, e.g. IVR, to the SSP that may be required by the SCP. When the SSP receives a GR-1129-CORE message from the SCP containing an operation value, e.g. a '0' (play announcement), '1' (play announcement and collect digits) or '4' (flex parameter block), it passes the content to the intelligent peripheral through ISDN or Q.931. When the intelligent peripheral, e.g. an IVR, starts the specified function, it establishes a voice channel to the user through the SSP. Because the SSP controls the voice channel, it can provide such services as call transfer after the IVR transaction is finished.

Those of skill in the art will appreciate that the referenced ITU and related standards are well known, evolving standards. Accordingly, reference herein to these standards will be understood to mean the standards as they existed at the time of the earliest effective filing date of the present application, and as they have evolved to date, and as they continue to evolve over the term of any patent that issues herefrom. Applicants note that an instructive earlier version of the ITU H.450.1 standard is described in *Generic functional protocol for the support of supplementary services in H.323*, date unknown; that the GR-1129-CORE standard is described in *AINGR: Switch—Intelligent Peripheral Interface (IPI)*, Revision 1, October, 1998 and *AINGR: Switch—Service Control Point (SCP)/Adjunct Interface*, September 1997; that the ITU-T H.225.0, ITU-T H.450.2 and ITU-T Q.931 standards are described in *Call Signaling Protocols and Media Stream Packetization for Packet Based Multimedia Communications Systems*, February 1998, *Call Transfer Supplementary Service for H.323I*, September 1997 and *ISDN User-Network Interface Layer 3 Specification for Basic Call Control*, March 1993, respectively.

No intelligent peripheral interface has been proposed heretofore that is compatible with the ITU-T H.323 or related H.225, H.245, H.450 and Q.931 standards, and the GR-1129-CORE standard.

SUMMARY OF THE INVENTION

The invention involves telecommunications apparatus between a voice frame network gatekeeper and intelligent peripheral. One such exemplary intelligent peripheral is the interactive voice response unit (IVR) described and illustrated herein. Other intelligent peripherals may use the invented interface, however, within the spirit and scope of the invention.

Telecommunications apparatus between a voice frame network gatekeeper and an intelligent peripheral, e.g. an interactive voice response unit (IVR), includes a voice frame network connection for coupling the same. The apparatus also includes a protocol over the connection that provides supplemental service messaging therebetween, the protocol enabling the gatekeeper to selectively insert one or more messages to the intelligent peripheral and to selectively intercept one or more messages therefrom. Preferably such insertion is of one or more GR-1129-CORE send-to-resource (STR) messages and such interception is of one or more ITU-T H.323 FACILITY messages including a RETURN RESULTS component. An invocation mechanism within the gatekeeper and a performance mechanism within the IVR permits the gatekeeper to set a defined task to the IVR, also preferably in accordance with the ITU-T H.323 and H.450 standards.

The method involves configuring the gatekeeper as a supplemental services provider (SSP) and configuring the IVR as an intelligent peripheral, under ITU-T H.450. The method further involves conveying requests from the gatekeeper to the IVR and conveying responses thereto from the IVR to the gatekeeper, wherein the gatekeeper selectively intercepts one or more messages from the IVR and, optionally, also selectively inserts one more messages to the IVR.

The foregoing and other objects, features and advantages of the invention will become more readily apparent from the following detailed description of a preferred embodiment that proceeds with reference to the drawings.

DETAILED DESCRIPTION OF THE PREFERRED EMBODIMENT

Figure 1:
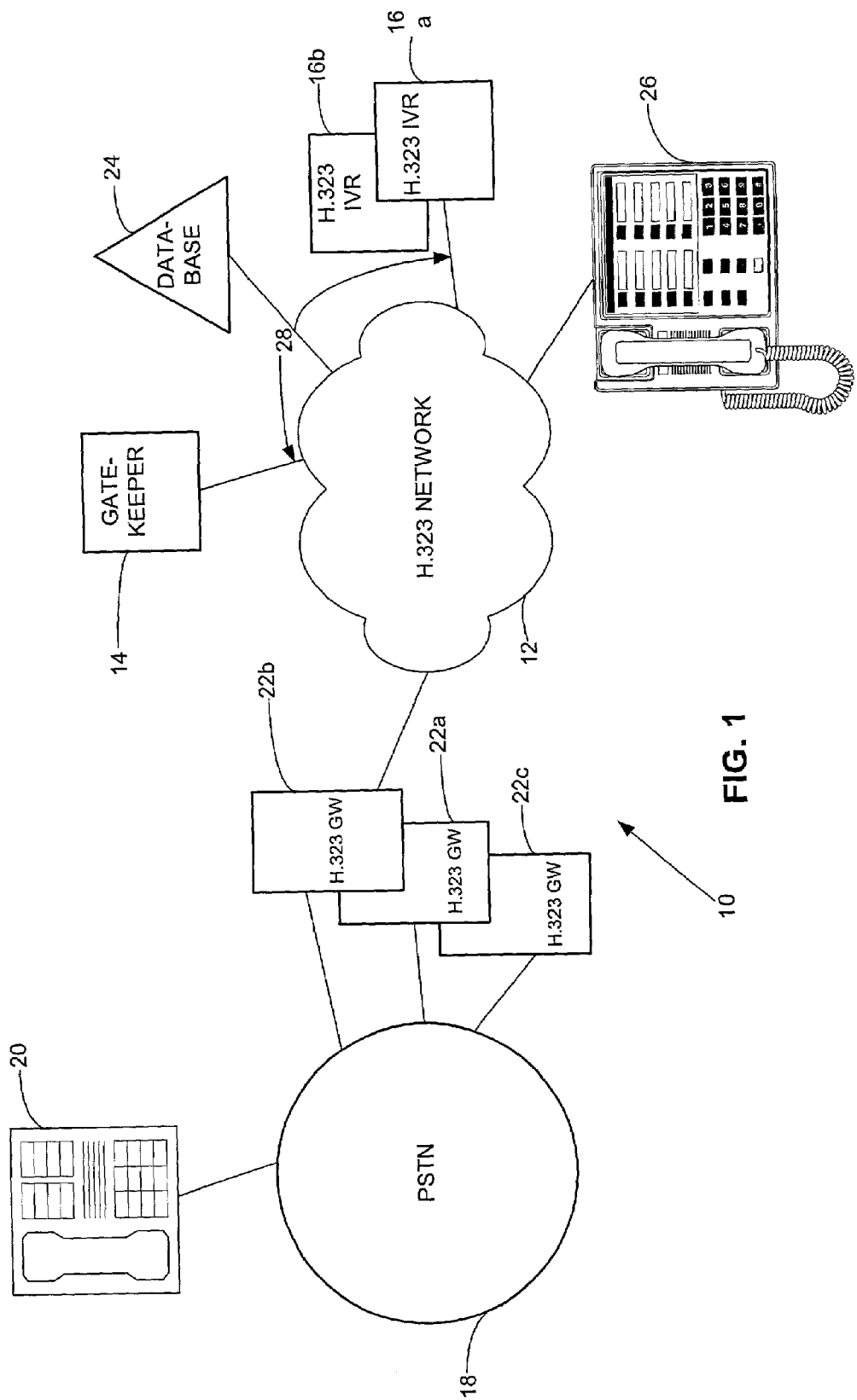
FIG. 1 is a system block diagram illustrating a voice frame network with a gatekeeper and an intelligent peripheral interfaced in accordance with a preferred embodiment of the invention.

FIG. 1 is a system block diagram of a network 10, i.e. the Internet, with a voice frame network, e.g. an H.323 network, 12 forming a part thereof. A gatekeeper 14 and one or more intelligent peripherals, e.g. interactive voice response units (IVRs), 16a, 16b may be seen to represent two or more nodes within voice frame network 12. Those of skill in the art will appreciate that typically there may be many such voice frame networks such as voice frame network 12 connected to the Internet. Those of skill in the art also will appreciate that typically there may be many such connected gatekeepers and intelligent peripherals such as gatekeeper 14 and IVR 16a.

A public switched telephone network (PSTN) 18 may connect voice traffic from one or more telephones 20 to H.323 network 12 via one or more H.323 gateways (GWs) 22a, 22b, 22c. A customer database 24 is connected to H.323 network 12 to provide needed preferences such as scripts, announcements or other recordings for play out, as will be described. Internet protocol (IP) phones 26 or other H.323 devices may also be connected to H.323 network 12, as shown.

The invented gatekeeper-to-intelligent peripheral interface is indicated generally at 28. Interface 28 will be understood to be implemented preferably in software or firmware, but it may be implemented, within the spirit and scope of the invention, in hardware. Interface 28 will be understood to span and interconnect—as well as define the behavioral relationship between—gatekeeper 14 and intelligent peripheral 16. Interface 28 accordingly may be implemented as compatible and communicative software modules residing in gatekeeper 14 and IVR 16a, preferably integrated with the software that controls the conventional functions of the gatekeeper and the intelligent peripheral.

Figure 2:
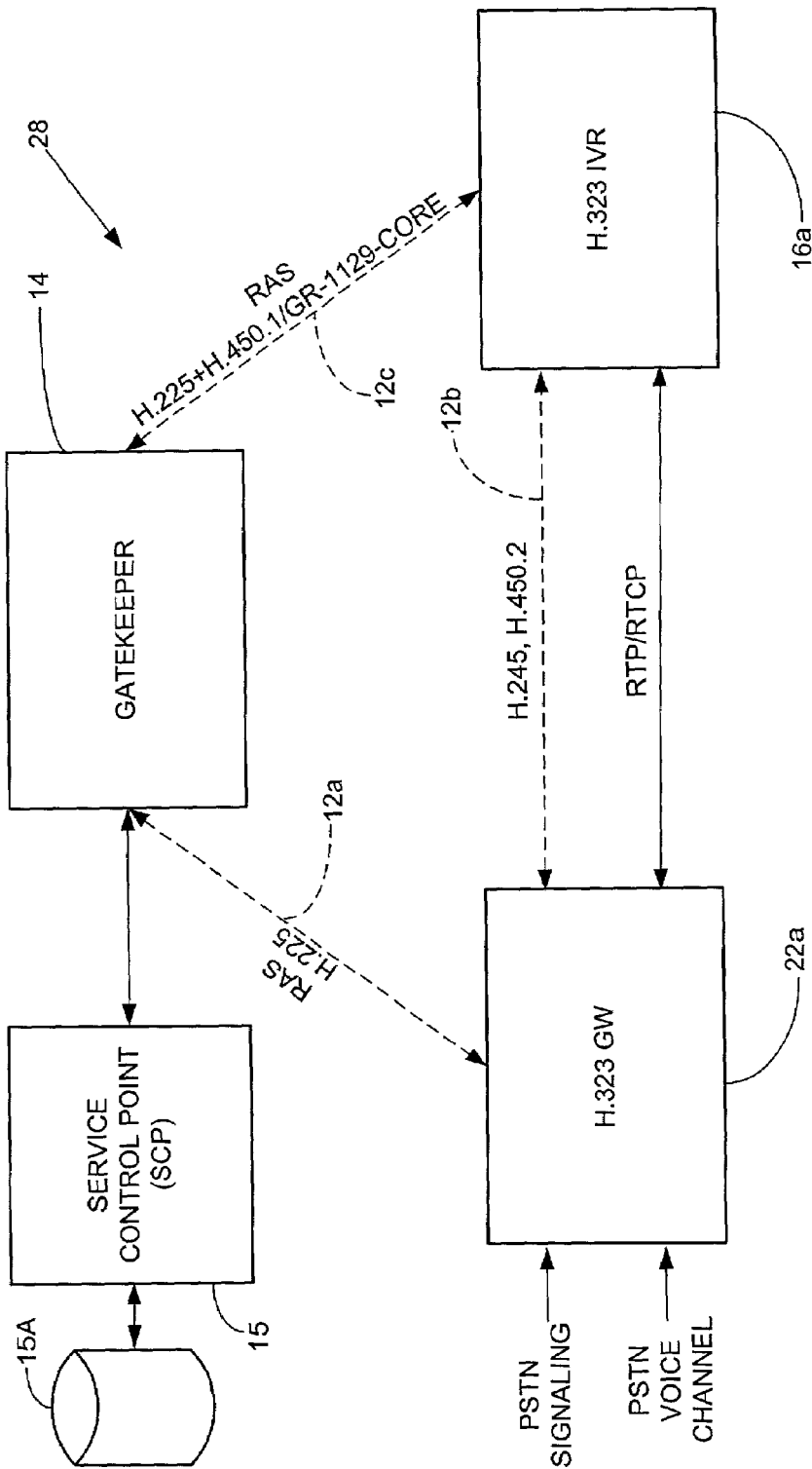
FIG. 2 is a schematic block diagram of the H.323 gatekeeper, intelligent peripheral and gateway architecture in accordance with a preferred embodiment of the invention.

FIG. 2 shows H.323 GW 22a terminating the public switched telephone network (PSTN) signaling channel and voice channel and originating H.323 signaling channels 12a, 12b and an RTP/RTCP (voice) stream. Because H.323 gatekeeper 14 does not directly control the voice channel, it is provided with auxiliary means to obtain indirect control of the voice channel via interface 28 to IVR 16a. Importantly, such auxiliary means are compatible with the existing GR-1129-CORE-based standards, and, by extension thereof but without modification, the interface provides for the needed call transfer and other features under the International H.323/H.225./H.245/H.450 standards. Accordingly, the invented H.323 gatekeeper-intelligent peripheral interface 28 provides full and extensible functionality and compatibility with old and new standards and protocols.

Also shown in FIG. 2 is a conventional SCP 15 with associated data storage device, e.g. disc drive, 15a. Those of skill in the art will appreciate that in accordance with the invention, gatekeeper 14 is capable of selective interception and insertion or removal of messages and content between the gatekeeper and the intelligent peripheral, as will be explained in detail below. Importantly, such selective interception and insertion or removal of messages and content permits much greater flexibility in messaging between a calling party and a called party, yet without any required modification to the installed base of SCPs and associated data storage devices.

Figure 3:
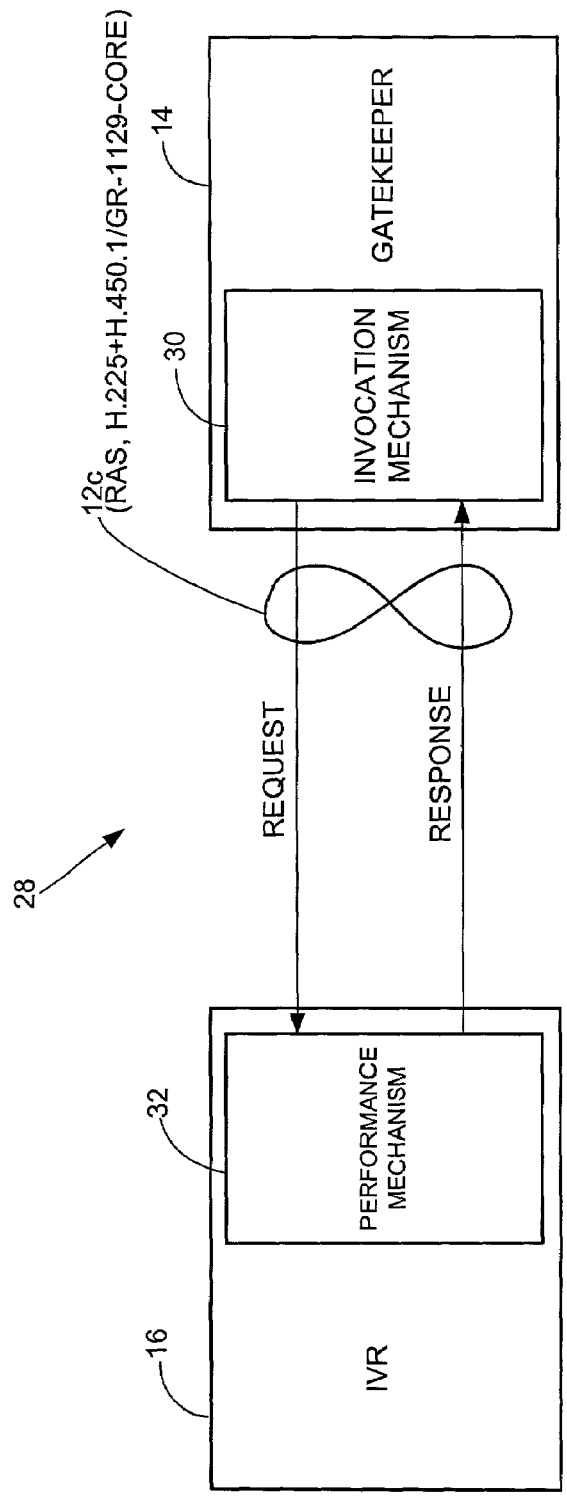
FIG. 3 is a more detailed schematic diagram of the gatekeeper-to-intelligent peripheral interface in accordance with a preferred embodiment of the invention.

FIG. 3 shows interface apparatus 28 in the form of a more detailed schematic diagram. Gatekeeper 14 may be seen to be interfaced to IVR 16a via interface 28 by inclusion preferably of memory-resident software instructions executed by a processor that forms a part of the gatekeeper and intelligent peripheral. In other words, additional code may readily be installed in the existing base of gatekeepers and intelligent peripherals to render them compatible with the International H.323 standard. The invented apparatus in a preferred embodiment of the invention thus preferably includes a voice frame network connection 12c for coupling gatekeeper 14 to IVR 16a. It further includes protocols (RAS, H.225+H.450.1+GR-1129-CORE) over the connection that provides supplemental services messaging between the gatekeeper and the intelligent peripheral, the protocol conveying a REQUEST from the gatekeeper to the intelligent peripheral and a RESPONSE from the intelligent peripheral to the gatekeeper. Finally, it includes a command structure (to be described below) embedded in such request/response protocol, the command structure including a call-transfer request/response sequence to which the gatekeeper is responsive.

Interface apparatus 28 in another preferred form may be thought of as coordinating a voice frame network gatekeeper and an intelligent peripheral. Preferably, in this form, interface apparatus 28 includes an invocation mechanism 30 within gatekeeper 14 for setting a defined task to IVR 16a via in-band signaling. Interface apparatus 28 further includes a performance mechanism 32 within the intelligent peripheral responsive to the invocation mechanism for performing the defined task. Importantly, the invocation mechanism and the performance mechanism comply with International H.323, H.225 and H.450.x standards (where x indicates successive versions).

Figure 4:
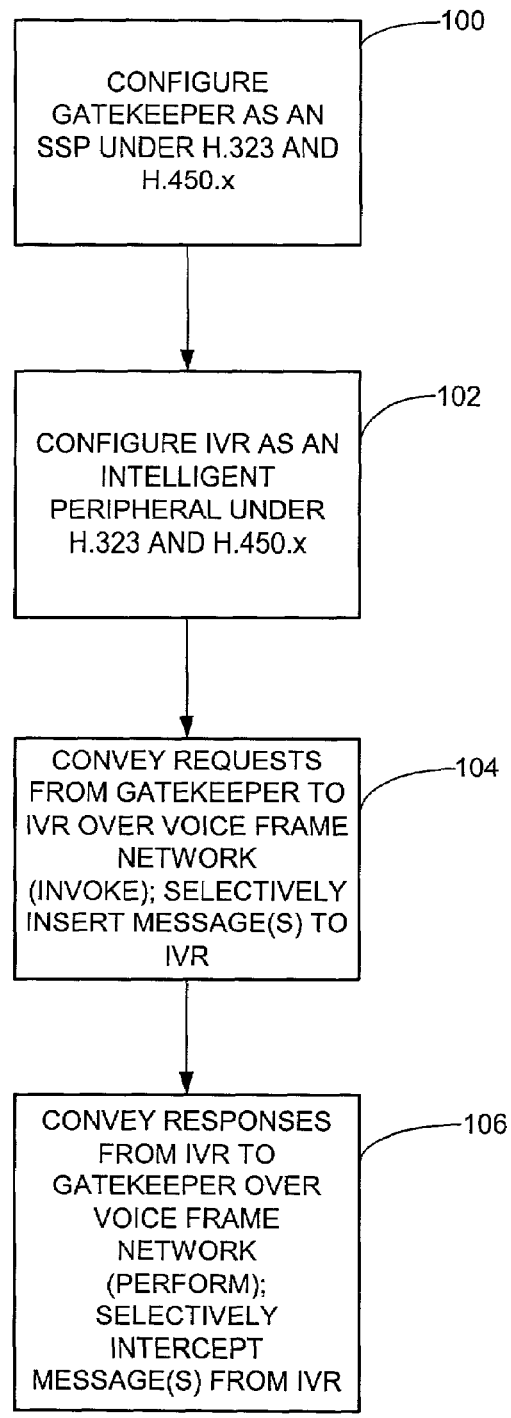
FIG. 4 is a flowchart illustrating the interface method in accordance with a preferred embodiment of the invention.

FIG. 4 illustrates the invented gatekeeper-to-intelligent peripheral interfacing method preferably is implemented in accordance with the invention. At 100, gatekeeper 14 is configured as a supplemental services provider (SSP) under the H.323 and H.450.x standards. At 102, IVR 16a is configured as an Intelligent Peripheral under the same standard.

At 104, requests are conveyed from gatekeeper 14 to IVR 16a over voice frame network 12 in accordance with a defined protocol, e.g. the protocol described above or a suitable alternative. Those of skill in the art will appreciate that, in accordance with the present invention, gatekeeper 14 selectively inserts a message, e.g. an STR message, to the intelligent peripheral, e.g. IVR 16a. Gatekeeper 14 also may, in accordance with the spirit and scope of the invention, selectively remove a message, e.g. a reject (REJECT) component of a release complete (RELEASE COMPLETE) message, from the message stream to the intelligent peripheral, e.g. IVR 16a.

At 106, responses to the requests are conveyed from IVR 16a to gatekeeper 14 and are received by gatekeeper 14 over voice frame network 12 in accordance also with a defined protocol, as described and illustrated herein. For example, IVR 16a may return any of the standard operation return result, return error or reject transaction responses under International standard H.450.x. Those of skill in the art will appreciate that, in accordance with the present invention, gatekeeper 14 selectively intercepts a message, e.g. a FACILITY message containing a RETURN RESULTS component, from the intelligent peripheral, e.g. IVR 16a. Such selective message interception may be referred to herein as selective message termination by the gatekeeper.

Those of skill in the art will appreciate that Bellcore GR-1129-CORE for AIN 0.1 provides an interface between an AIN SSP and an AIN intelligent peripheral. It has following three characteristic types of information exchange on an ISDN interface between SSP and an intelligent peripheral: 1) The SCP requiring the intelligent peripheral to exchange information with a user, in which the SSP forwards data from the SCP to an intelligent peripheral and sets up an in-band connection between the user and the intelligent peripheral; 2) The SSP supporting ISDN BRI and PRI between an intelligent peripheral and an SSP for signaling and transport for call originations and call terminations; 3) The SSP providing protocol inter-working from an intelligent peripheral on ISDN BRI and PRI to a SCP for non-call associated signaling.

The interface between the GK and the H.323 intelligent peripheral uses the H.450.1 APDU in the H.225.0 call signaling messages and follows the GR-1129-CORE signaling scheme originally for interface between the SSP and an ISDN-connected intelligent peripheral. The high level architecture of this interface is showed in FIG. 2. The GK can be considered an SSP that provides specified SCP services and the H.323 IVR can be considered an intelligent peripheral. Importantly, in accordance with the present invention, GK is programmed selectively to insert messages, e.g. one or more send-to-resource (STR) messages, to the intelligent peripheral, e.g. IVR 16a. Also importantly, GK is programmed further selectively to intercept messages, e.g. one or more facility (FACILITY) messages, from the intelligent peripheral, e.g. IVR 16a, wherein typically the intercepted FACILITY message contains a return results (RETURN RESULTS) component.

TABLE 1 below summarizes the GR-1129-CORE defined signaling supported by an SSP used for the GK in accordance with invention.

In order to use GR-1129 for interface between GK and the H.323 intelligent peripheral, the GR-1129-CORE message Send_To_Resource (STR) can be generated by any services that request the intelligent peripheral resource, either AIN services on SCP or H.323 services on GK. The operation of the STR message is contained in an H.450 Application Protocol Data Unit (APDU) carried in the H.225.0 FACILITY or SETUP message and response is returned in a non-standard data carried in the H.225.0 FACILITY or RELease COMplete message. Other H.225.0 call signaling messages are not allowed to carry a STR operation.

The above-referenced protocol and command structure now will be described. Preferably, conveying step 104 includes invoking a call-transfer request/response sequence to which the intelligent peripheral is responsive to route a given call to a different telephone line (extended value '100'), the number of which is provided in conjunction with the call-transfer request/response sequence (via flex-parameter-block and/or database 24). More preferably, conveying step 104 further includes invoking play-recorded-audio (value '0') and play-recorded-audio-and-await-digital-input (value '1') sequences to which IVR 16a is responsive. Most preferably, conveying step 104 further includes invoking flex-parameter-block (value '4'), play-recorded-audio-and-terminate-call (extended value '101') and play-recorded-audio-using-specified-script (extended value '102') sequences to which IVR 16a is responsive. Those of skill in the art will appreciate that, in accordance with the invention, the protocol and embedded command are realized by in-band signaling, between the gatekeeper and the intelligent peripheral, i.e. signaling or messaging across network connection 12c.

TABLES 2 through 5 immediately below summarize STR signaling between GK 14 and IVR 16a, in accordance with the invention by the use of H.450.1 APDU, which is compatible nevertheless compatible with both ITU H.323 and GR-1129-CORE. TABLES 2–5 are believed to be self-explanatory to those of ordinary skill in the art.

TABLE 1

| SSP supported signaling providing for | SSP supported signaling used by GK |
|---|---|
| Setting up a connection between a user and an intelligent peripheral, and passing information between a service on SCP and the intelligent peripheral related to that connection | A trigger is encountered by the GK, and related service is invoked to process the call. The service can be resident on the GK or on a SCP. The service requires GK to setup a connection between user and the H.323 intelligent peripheral to exchange information between them related to the call |
| Passing non-call associated data between the service on SCP and an ISDN-connected device | Passing non-call associated data, such as authentication information, password or Personal Identification Number (PIN), etc., between the service on GK or SCP and the H.323 intelligent peripheral |
| Allowing call origination and call termination over the intelligent peripheral | Allowing call terminating at the H.323 intelligent peripheral, such as playing an announcement before release the call and the H.323 intelligent peripheral reports the result to GK |

TABLE 2

GK USES FACILITY MESSAGE WHEN A SUBSEQUENCE COMPONENT IS SENT TO H.323 IVR FOR ACTIVE STR-CONNECTION

| Information Element | Value | Inclusion Condition |
| --- | --- | --- |
| Protocol discriminator | Q.931 | Mandatory |
| Call reference (CR) | CR value = value in SETUP message | Mandatory |
| Message type | FACILITY | Mandatory |
| User-to-User | | Mandatory |
| H.450.1 APDU | Invoke component (See Section 5.2.3 of GR-2823-CORE.) | Mandatory for IVR interface |

Direction: GK → IVR

TABLE 3

H.323 DIR USES FACILITY MESSAGE FOR SUBSEQUENCE RESULT EXCHANGE WITH GK FOR ACTIVE STR-CONNECTION

| Information Element | Value | Inclusion Condition |
| --- | --- | --- |
| Protocol discriminator | Q.931 | Mandatory |
| Call reference (CR) | CR value = value in SETUP message | Mandatory |
| Message type | FACILITY | Mandatory |
| User-to-User | | Mandatory |
| H.450.1 APDU | Return Result, Return Error, or Reject component (See Section 5.2.3 of GR-2823-CORE.) | Mandatory for IVR interface |

Direction: IVR → GK

TABLE 4

H.323 DIR USES RELEASE COMPLETE MESSAGE TO INDICATE IT HAS RELEASED BOTH BEARER AND SIGNALING CHANNELS AND CALL REFERENCE

| Information Element | Value | Inclusion Condition |
| --- | --- | --- |
| Protocol discriminator | Q.931 | Mandatory |
| Call reference | CR value = value in SETUP message | Mandatory |
| Message type | RELease COMplete | Mandatory |
| Cause (defined in Q.931) | 16 = normal clearing (currently not used)<br>21 = call rejected<br>65 = bearer capability not implemented | Mandatory |
| User-to-User | | Mandatory |
| H.450.1 APDU | Return Result, Return Error, or Reject component (See Section 5.2.3 of GR-2823-CORE.) | Mandatory for IVR interface |

Direction: IVR → GK

TABLE 5

GK USES SETUP MESSAGE TO ESTABLISH STR-CONNECTION TO H.323 TVR AND REQUEST "sendToResource" OPERATION

| Information Element | Value | Inclusion Condition |
| --- | --- | --- |
| Protocol discriminator | Q.931 | Mandatory |
| Call reference (CR) | any valid value not in use | Mandatory |
| Message type | SETUP | Mandatory |
| Bearer capability | See Section 7.3.10 of H.225.0 | Mandatory |
| User-to-User | | Mandatory |
| H.450.1 APDU | Invoke component (See Section 5.2.3 of GR-2823-CORE.) | Mandatory for IVR interface |
| Other information elements (Calling party number, Called party number, etc.) as defined in Table 11 of H.225.0 | As defined in H.225.0 | As required in H.225.0 for Calling Party Number if subscribed to by the IVR |

Direction: GK → IVR

Setup and clearing of the connection between the GK and the H.323 intelligent peripheral in accordance with the invention will now briefly be described.

If the SETUP message is not acceptable (e.g., the protocol errors and invalid Invoke component), the H.323 intelligent peripheral responds with a RELease COMplete message that contains a Return Result, Return Error, or Reject component.

A preferred method of clearing a GK initiated STR-connection is to have the GK send a "cancelResource" operation in a FACILITY message to the H.323 intelligent peripheral when the GK receives a Cancel_Resource_Event message from the SCP, when the calling user hangs up while the STR-connection is active, or when the GK application decides to terminate the IVR service due to some error condition. The GK expects the H.323 intelligent peripheral to send a RELease COMplete message when the H.323 intelligent peripheral receives the "cancelResource" operation in a FACILITY message.

The invoker (GK) uses the return result component described below in TABLE 6 to request an operation from the performer (intelligent peripheral, e.g. IVR).

TABLE 6

INVOKE COMPONENT

| Data Element | Value | Inclusion Condition |
| --- | --- | --- |
| Component type | Invoke as defined in Section 5.4.1 of GR-2823-CORE for Primary Rate interface (PRI) | Mandatory |
| Invoke Identifier | Invoke identifier value = any value not in use. Invoke identifier is defined in Section 5.4.2 of GR-2823-CORE for PRI | Mandatory |
| Operation value | Use Operation value tag and length for object identifier as defined in Section 5.4.5 of GR-2823-CORE for PRI. | Mandatory |
| Argument(s) | The possible arguments for "sendToResource" operation are: Resource Type, strParameterBlock and DisplayText. There is no argument for "cancelResource" operation. | Conditional |

Direction: GK → IVR

The IVR uses the return result component described below in TABLE 7 to return results and to indicate that the operation was performed successfully.

TABLE 7

RETURN RESULT COMPONENT

| Data element | Value | Inclusion Condition |
| --- | --- | --- |
| Component type | Return Result as defined in Section 5.4.1 of GR-2823-CORE for PRI. | Mandatory |
| Invoke Identifier | Invoke identifier value = value in Invoke component for this component exchange. | Mandatory |
| Sequence | Sequence is defined in Section 5.4.6 of GR-2823-CORE for PRI. | Conditional (included if any results are returned) |
| Operation value | Use Operation value tag and length for object identifier as defined in Section 5.4.5 of GR-2823-CORE for PRI. | Conditional (included if any results are returned) |
| Results | The possible results for "sendToResource" operation are: ReturnBlock | Conditional |

Direction: IVR → GK

The GK and the intelligent peripheral use the return error component described below in TABLE 8 to indicate the requested operation was performed unsuccessfully. For example, the GK uses it to signal the intelligent peripheral that an error was discovered in its return component, and the intelligent peripheral uses it to signal the GK that an error was discovered in the invoke component.

TABLE 8

RETURN ERROR COMPONENT

| Data Element | Value | Inclusion Condition |
| --- | --- | --- |
| Component type | Return Error as defined in Section 5.4.1 of GR-2823-CORE for PRI. | Mandatory |
| Invoke Identifier | Invoke identifier value = value in Invoke component for this component exchange | Mandatory |
| Error value | Use Error value tag and length as defined in Section 5.4.7 of GR-2823-CORE for PRI. | Mandatory |
| Parameter(s) | FIGS. 4-3 of GRI-1129-CORE defines Error-parameter returned for "sendToResource" operation | Conditional |

Direction: IVR ←→ GK

The GK and intelligent peripheral use the reject component described below in TABLE 9 to indicate that a received operation component was rejected.

TABLE 9

REJECT COMPONENT

| Data Element | Value | Inclusion Condition |
| --- | --- | --- |
| Component type | Reject as defined in Section 5.4.1 of GR-2823-CORE for PRI | Mandatory |
| Invoke Identifier | Invoke identifier value = value in Invoke component for this component exchange | Mandatory |
| Problem value | Use Reason for component rejection as defined in Section 5.4.8 or FIG. 5-3 in Section 5.5.1 or GR-2823-CORE for PRI. | Mandatory |

Direction: IVR ←→ GK

The signaling procedures for the interface between the GK and the intelligent peripheral will be appreciated by those of skill in the art to be based on GR-1129-CORE procedures for an SSP communicating with an intelligent peripheral. The model used for signaling procedures is a request/reply exchange. Briefly summarizing, the invoker (GK) requests a service from the performer (intelligent peripheral, e.g. IVR). It expects that the performer respond either with success or failure to the request from the invoker.

A component consists of a request to performer as an operation. An operation is an action to be performed by the remote end. A component can also consist of a report of success or failure due to execution of the operation by the remote end. In accordance with a preferred embodiment of the invention, four components are used to request and respond to an operation between the GK and the intelligent peripheral. An operation is defined by its operation value and the arguments associated with the operation.

The four components tabulated above in TABLES 6 through 9 will be described in more detail below.

The GK will use an invoke component to begin a new component exchange with the intelligent peripheral. In accordance with invented interface 28, the intelligent peripheral will not initiate a new component exchange with the GK. The invoke component contains a parameter to identify an operation and the arguments needed by the performer to perform the requested operation.

If the requested operation is performed successfully, the intelligent peripheral will send a return result component in response to the invoke component from the GK (the invoker). The return result component may contain some parameters to be returned to the invoker.

The intelligent peripheral will send a return error component to the GK in response to the invoke component if the requested operation cannot be performed. The return error component contains a specific error cause for each situation that indicates the reason for failure. Those of skill in the art will appreciate that, within the spirit and scope of the invention, it may contain other or additional parameters.

A Reject component will be sent by the intelligent peripheral to reject a received Invoke component. The components may be rejected for such reasons as protocol violations or unrecognized components or parameters. The reject component preferably contains a parameter that indicates the reason for rejection.

The interface 28 command structure is briefly summarized below in TABLE 10.

TABLE 10

REQUIRED ELEMENTS FOR RESOURCE TYPE

| ResourceType | StrParameterBlock | Rerouting Number | Comments |
|---|---|---|---|
| 0: PlayAnnouncement | AnnouncementBlock | N/A | |
| 1: PlayAnnouncement and Collect Digits | AnnouncementDigit Block | N/A | |
| 100: Perform CT | N/A | AlianAddress | Intelligent peripheral will execute the H.450.2 CT to the endpoint specified by the ReroutingNumber |
| 101: Play Announcement and Terminate the Call | AnnouncementBlock | N/A | Intelligent peripheral terminates the call after announcement is played |
| 102: Play Announcement with Specified Script | FlexParameterBlock (in which the name of the script is given) | N/A | The script is executed by the H.323 intelligent peripheral |

The GK sends an invoke component that contains an operation "sendToResource" in a SETUP message to the intelligent peripheral. The intelligent peripheral responds with appropriate H.225.0 call signaling messages, such as CALL PROCeeding, ALTERing, or CONNect, and accepts the STR-connection. The intelligent peripheral either sends a return result component (contained in H.450.1 APDU of the RELease COMplete message) if the operation is performed successfully, or a return error component (contained in the non-standard data of the RELease COMplete message) if the operation cannot be performed. In accordance with a preferred embodiment of the invention, the intelligent peripheral does not clear the STR-connection when it has taken the final action on the requested operation.

If the intelligent peripheral is unable to process the "sendToResource" operation contained in the SETUP message, it takes one of the following actions:

The intelligent peripheral clears the STR-connection and rejects the SETUP message by sending a RELease COMplete message contains a reject component. The intelligent peripheral may reject for such reasons as protocol violations or unrecognized components. Preferably, the reject component contains a parameter that indicates the reason for rejection.

Preferably, the intelligent peripheral accepts the STR-connection and then sends a FACILITY message if it does not recognize the "sendToResource" operation. The intelligent peripheral rejects for such reasons as unrecognized operations. The reject component preferably contains a parameter that indicates the reason for rejection.

For a STR-connection in the active state, the FACILITY message is also used for the exchange of components over the existing signaling connection. This signaling connection is identified by the call reference value of the corresponding STR-connection. If an STR-connection associated FACILITY message is sent by using a call reference value of an active STR-connection, and this STR-connection is cleared due to STR-connection related causes, then the GK or the intelligent peripheral sends a response within H.450.1 APDU in the first clearing message, i.e., the RELease COMplete message.

The GK sends a SETUP message to the intelligent peripheral when the GK requires intelligent peripheral service or the GK application receives a STR message from the SCP.

The following script illustrates a valid STR-connection establishment message sequence to the H.323 intelligent peripheral.

H.225.0 Call Signaling With GR-1129-Core Extension Script
Setup (GK→IVR)
Timeout T303
Setup (GK→IVR)
Call
Proceeding (IVR→GK)
Altering (IVR→GK)
Connect (IVR→GK)
Connect Ack (GK→IVR)

It will be appreciated that if the H.323 intelligent peripheral does not respond within a predefined time limit, e.g. within timeout T303, then a second SETUP message is sent. The only valid response messages sent by the H.323 intelligent peripheral to an incoming SETUP message are:
CALL PROCeeding—CONNect;
CALL PROCeeding—ALTERing—CONNect;
ALTERing—CONNect; or
CONNect.

A preferred method of clearing an H.323 intelligent peripheral initiated STR-connection is to have the H.323 intelligent peripheral send a RELease COMplete message in response to a SETUP message.

Such a flex-parameter-block sequence invokes in IVR 16*a* a defined, but variable response, typically as may be determined by individual manufacturers of the intelligent peripheral or gatekeeper. For example, in a preferred embodiment of the invention, the flex-parameter-block sequence may contain a script file name that the intelligent peripheral has pre-loaded. When extended value '102' is conveyed from the gatekeeper to the intelligent peripheral, the command may be to play-announcement-using-script-name-specified-in-flex-parameter-block. The flex-parameter-block may contain the parameter script-file-2. In response, the intelligent peripheral would load the specified script file, e.g. from database 24, and play it out rather than a default announcement. Those of skill in the art will appreciate that the three existing defined GR-1129-CORE values, as well as the invented H.323 values and the respective features represented thereby are further extensible as the H.323 intelligent peripheral services evolve in accordance with the present invention. Any and all such overall features are contemplated, and are within the spirit and scope of the invention.

Those of skill in the art will appreciate that the values and their functions described herein are illustrative only and that the invention is not so limited. Any suitable set of functions assigned to any suitable set of values is contemplated, and is within the spirit and scope of the invention. Those of skill in the art also will appreciate that the added functionality of the gatekeeper and intelligent peripheral made possible by provision of the invented interface therebetween is transparent to other voice frame network devices. This ensures its broad compatibility in network design with the installed base of intelligent peripheral (e.g. IVR), AIN, GR-1129-CORE and H.323 equipment.

Finally, those of skill in the art will appreciate that the invented method and apparatus described and illustrated herein may be implemented in software, firmware or hardware, or any suitable combination thereof. Preferably, the method and apparatus are implemented in software, for purposes of low cost and flexibility. Thus, those of skill in the art will appreciate that the method and apparatus of the invention may be implemented by a computer or microprocessor process in which instructions are executed, the instructions being stored for execution on a computer-readable medium and being executed by any suitable instruction processor. Alternative embodiments are contemplated, however, and are within the spirit and scope of the invention.

Having illustrated and described the principles of my invention in a preferred embodiment thereof, it should be readily apparent to those skilled in the art that the invention can be modified in arrangement and detail without departing from such principles. We claim all modifications coming within the spirit and scope of the accompanying claims.

The invention claimed is:

1. Telecommunications apparatus between a voice frame network gatekeeper and an intelligent peripheral in a packet switched network, the apparatus comprising:
   a voice frame network connection for coupling the gatekeeper to the intelligent peripheral over the packet switched network; and
   said connection provides supplemental services messaging between the gatekeeper and the intelligent peripheral in accordance with a International H.450 standard protocol, said protocol enabling the gatekeeper to operate as a supplemental services provider (SSP) under the International H.450 standard to selectively insert one or more messages to the intelligent peripheral and to selectively intercept one or more messages from the intelligent peripheral, where the supplemental services messaging exchanges non-call associated signaling including a password or a personal identification number between the gateway and the intelligent peripheral.

2. The apparatus of claim 1, wherein said protocol further enables a selective insertion of one or more messages to the gatekeeper.

3. The apparatus of claim 2, wherein such selective insertion of one or more messages to the gatekeeper includes selective insertion of one or more release complete (REL-COM) messages in accordance with the International ITU-T H.323 standard.

4. The apparatus of claim 1, wherein such selective insertion of one or more messages by the gatekeeper including selectively inserting one or more send-to-resource (STR) messages in accordance with the GR-1129-CORE standard over the packet switched network.

5. The apparatus of claim 1, wherein such selective interception includes selective interception of one or more facility (FACILITY) messages in accordance with the International ITU-TH.323 standard.

6. The apparatus of claim 5, wherein at least one of the one or more FACILITY messages includes a return results (RETURN RESULTS) component.

7. The apparatus of claim 1 which further comprises:
   a service control point operatively connected to the gatekeeper and to a database, said service control point providing information contained in said database to the gatekeeper in response to a query therefrom, where the information includes the non-call associated signaling.

8. Telecommunications apparatus for coordinating a voice frame network gatekeeper and an interactive voice response unit including a performance mechanism for performing a defined task responsive to the gatekeeper, the apparatus comprising:
   a voice frame network connection for coupling the gatekeeper to the interactive voice response unit;
   an invocation mechanism within the gatekeeper for setting a defined task to the interactive voice response unit via in-band signaling; and
   a protocol enforcing processor that provides supplemental services messaging between the gatekeeper and the interactive voice response unit over said voice frame network conection, said protocol enforcing processor enabling the gatekeeper to selectively insert one or more messages to the interactive voice response unit and to selectively intercept one or more messages from the interactive voice response unit, where the supplemental services messaging exchanges non-call associated signaling including a password or a personal identification number between the gateway and the interactive voice response unit.

9. The apparatus of claim 8, wherein said invocation mechanism and said performance mechanism comply with International ITU-T H.323 and H.450 standards.

10. The apparatus of claim 9, wherein said protocol enforcing processor further enables selective insertion of one or more messages to the gatekeeper.

11. The apparatus of claim 10, wherein such selective insertion of one or more messages to the gatekeeper includes selective insertion of one or more release complete (RELCOM) messages in accordance with the International ITU-T H.323 standard.

12. Telecommunications apparatus for coordinating a voice frame network gatekeeper and an interactive voice response unit including a performance mechanism for performing a defined task responsive to the gatekeeper, the apparatus comprising:
   a voice frame network connection for coupling the gatekeeper to the interactive voice response unit;
   an invocation mechanism within the gatekeeper for setting a defined task to the interactive voice response unit via in-band signaling; and
   a protocol enforcing processor that provides supplemental services messaging between the gatekeeper and the interactive voice response unit, over said voice frame network connection, said protocol enforcing processor enabling the gatekeeper to selectively insert one or more messages to the interactive voice response unit and to selectively intercept one or more messages from the interactive voice response unit;
   wherein said invocation mechanism and said performance mechanism comply with International ITU-T H.323 and H.450 standards, said processor further enables selective insertion of one or more messages to the gatekeeper, and such selective insertion of one or more messages to the gatekeeper includes selective insertion of one or more release complete (RELCOM) messages in accordance with the International ITU-T H.323 standard such selective insertion of one or more messages to the interactive voice response unit including selective insertion of one or more send-to-resource (STR) messages in accordance with the GR-1129-CORE standard.

13. The apparatus of claim 12, wherein such selective insertion of one or more messages to the gatekeeper includes selective insertion of one or more facility (FACILITY) messages in accordance with the International ITU-T H.323 standard.

14. A method of interfacing a voice frame network gatekeeper and an interactive voice response unit (IVR) configured as an intelligent peripheral under International H.450 standard with a service control point (SCP), the method comprising:
- configuring the gatekeeper as a supplemental services provider (SSP) under International H.450 standard;
- first conveying requests from the gatekeeper to the IVR over the voice frame network in accordance with a defined protocol, where the IVR transmits previously recorded audio data over the voice frame network responsive to at least one of the requests; and
- receiving responses to the requests from the IVR at the gatekeeper over the voice frame network in accordance with a defined protocol;
- wherein the gatekeeper selectively intercepts one or more messages from the IVR and selectively inserts one or messages to the IVR.

15. A method of claim 14, which further comprises:
- configuring the IVR as an intelligent peripheral under International H.450 standard; and
- second conveying responses to the requests from the IVR to the gatekeeper over the voice frame network in accordance with a defined protocol.

16. A method of interfacing a voice frame network gatekeeper and an interactive voice response unit (IVR) configured as an intelligent peripheral under International H.450 standard with a service control point (SCP), the method comprising:
- configuring the gatekeeper as a supplemental services provider (SSP) under International H.450 standard;
- first conveying requests from the gatekeeper to the IVR over the voice frame network in accordance with a defined protocol; and
- receiving responses to the requests from the IVR at the gatekeeper over the voice frame network in accordance with a defined protocol,
- wherein the gatekeeper selectively intercepts one or more messages from the IVR, the gatekeeper selectively inserts one or more messages to the IVR, and such selective interception includes selective interception of one or more facility (FACILITY) messages in accordance with the International ITU-T H.323 standard, and wherein such selective insertion includes selective insertion of one or more send-to-resource (STR) messages in accordance with the GR-1129-CORE standard.

17. A computer-readable medium containing a program for interfacing a voice frame network gatekeeper and an interactive voice response unit (IVR) configured as an intelligent peripheral under International H.450 standard with a service control point (SCP), the program comprising:
- instructions for configuring the gatekeeper as a supplemental services provider (SSP) under International H.450 standard;
- instructions for first conveying requests from the gatekeeper to the IVR over the voice frame network in accordance with a defined protocol, where the IVR transmits previously recorded audio data over the voice frame network responsive to at least one of the requests,
- instructions for receiving responses to requests from the IVR at the gatekeeper over the voice frame network in accordance with a defined protocol; and
- instructions for selectively intercepting one or more messages from the IVR and for selectively inserting one or more messages to the IVR.

18. A computer-readable medium of claim 17, wherein the program further comprises:
- instructions for configuring the IVR as an intelligent peripheral under International H.450 standard; and
- instructions for second conveying responses to requests from the IVR to the gatekeeper over the voice frame network in accordance with a defined protocol.

19. A computer-readable medium containing a program for interfacing a voice frame network gatekeeper and an interactive voice response unit (IVR) configured as an intelligent peripheral under International H.450 standard with a service control point (SCP), the program comprising:
- instructions for configuring the gatekeeper as a supplemental services provider (SSP) under International H.450 standard;
- instructions for first conveying requests from the gatekeeper to the IVR over the voice frame network in accordance with a defined protocol;
- instructions for receiving responses to requests from the IVR at the gatekeeper over the voice frame network in accordance with a defined protocol; and
- instructions for selectively intercepting one or more messages from the IVR and for selectively inserting one or more messages to the IVR, wherein said instructions for selectively intercepting includes instructions for selectively intercepting one or more facility (FACILITY) messages in accordance with the International ITU-T H.323 standard, and wherein said instructions for selectively inserting includes instructions for selectively inserting one or more send-to-resource (STR) messages in accordance with the GR-1129-CORE standard.

20. Apparatus for interfacing a voice frame network gatekeeper and an interactive voice response unit (IVR) configured as an intelligent peripheral under the International H.450 standard with a service control point (SCP), the apparatus comprising:
- means for configuring the gatekeeper as a supplemental services provider (SSP) under the International H.450 standard;
- means for first conveying requests from the gatekeeper to the IVR over the voice frame network in accordance with a defined protocol, said first conveying means including software instructions resident on a computer-readable medium and executable by a processor within the gatekeeper;
- means for receiving responses to requests from the IVR at the gatekeeper over the voice frame network in accordance with a defined protocol, said receiving means including software instructions resident on a computer-readable medium and executable by a processor within the gatekeeper; and means for selectively intercepting one or more messages from the IVR and for selectively inserting one or more messages to the IVR, said selective-intercepting-and-inserting means including software instructions resident on a computer-readable medium and executable by a processor within the gatekeeper, where at least one of the conveyed requests or received responses includes non-call associated signaling including a password or a personal identification number.

21. The apparatus of claim 20 which further comprises;

means for configuring the IVR as an intelligent peripheral under the International H.450 standard; and means for second conveying responses to requests from the IVR to the gatekeeper over the voice frame network in accordance with a defined protocol, said second conveying means including software instructions resident on a computer-readable medium and executable by a processor within the IVR.

22. Apparatus for interfacing a voice frame network gatekeeper and an interactive voice response unit (IVR) configured as an intelligent peripheral under the International H.450 standard with a service control point (SCP), the apparatus comprising:

means for configuring the gatekeeper as a supplemental services provider (SSP) under the International H.450 standard;

means for first conveying requests from the gatekeeper to the IVR over the voice frame network in accordance with a defined protocol, said first conveying means including software instructions resident on a computer-readable medium and executable by a processor within the gatekeeper;

means for receiving responses to requests from the IVR at the gatekeeper over the voice frame network in accordance with a defined protocol, said receiving means including software instructions resident on a computer-readable medium and executable by a processor within the gatekeeper; and means for selectively intercepting one or more messages from the IVR and for selectively inserting one or more messages to the IVR, said selective-intercepting-and-inserting means including software instructions resident on a computer-readable medium and executable by a processor within the gatekeeper, wherein said means for selectively intercepting includes means for selectively intercepting one or more facility (FACILITY) messages in accordance with the International ITU-T H.323 standard, and wherein said means for selectively inserting includes means for selectively inserting one or more send-to-resource (STR) messages in accordance with the GR-1129-CORE standard.

* * * * *

UNITED STATES PATENT AND TRADEMARK OFFICE
CERTIFICATE OF CORRECTION

| | | |
|---|---|---|
| PATENT NO. | : 7,136,373 B2 | Page 1 of 1 |
| APPLICATION NO. | : 09/753360 | |
| DATED | : November 14, 2006 | |
| INVENTOR(S) | : Gene Ma and Andrew Gutman | |

It is certified that error appears in the above-identified patent and that said Letters Patent is hereby corrected as shown below:

Title Page 1, section (75) inventors, please add --Andrew Gutman, Irvine, CA--

Signed and Sealed this

Fourteenth Day of February, 2012

David J. Kappos
*Director of the United States Patent and Trademark Office*